United States Patent Office 3,301,822
Patented Jan. 31, 1967

3,301,822
PROCESS COMPRISING REACTING COPOLYMERS WITH AN ALDEHYDE AND ALKYLENE OXIDE
Horst Dalibor, Harksheide, near Hamburg, Germany, assignor to Reichhold Chemicals, Inc., White Plains, N.Y.
No Drawing. Filed Dec. 14, 1964, Ser. No. 418,305
5 Claims. (Cl. 260—72)

The present invention relates to a process of preparing new copolymers that are highly useful, in pigmented or non-pigmented form, as baking enamels, and to the resulting product. They have excellent resistance to yellowing, stability toward chemicals and toward foods. They also have outstanding weather resistance and are capable of adhering with tenacity to glass ceramics, metals, wood and artificial masses upon being baked thereon.

The new copolymers are also very suitable as binders for masses to be hot-molded for the production of shaped articles.

These new copolymers are obtained by copolymerizing, upon heating, $\alpha,\beta$-unsaturated aromatic and/or $\alpha,\beta$-ethylenically unsaturated alkylcarboxylic acid esters or ethers and $\alpha,\beta$-ethylenically unsaturated mono- and/or dicarboxylic acids and $\alpha,\beta$-ethylenically unsaturated aliphatic and/or araliphatic acid amides in the presence of polymerization accelerators and inert solvents, and thereupon reacting the copolymer, by heating, with formaldehyde and/or substances that give up formaldehyde and monoepoxides in the presence of tertiary amines and/or quaternary ammonium compounds.

The term $\alpha,\beta$-unsaturated carboxylic acids is understood to include mono- and/or dicarboxylic acids and/or tricarboxylic acids, their anhydrides and monoesters such as acrylic acid, acrylic acid anhydride, methacrylic acid, maleic acid, maleic acid anhydride, maleic acid monomethyl-, ethyl-, propyl-, butyl,- or -2-ethylhexyl esters, fumaric acid, fumaric acid monomethyl-, ethyl-, propyl-, butyl-, hexyl-, -2-ethylhexyl esters, itaconic acid, itaconic acid monomethyl-, ethyl-, propyl-, butyl-, hexyl-, -2-ethylhexyl esters, aconitic acid and its mono- and/or diester. Preferred are acrylic acid, methacrylic acid, maleic acid monobutyl ester and itaconic acid.

Suitable $\alpha,\beta$-unsaturated carboxylic acid amides are acrylamide, methacrylamide, ethacrylamide, phenylacrylamide, maleic acid monobutyl ester amide, maleic acid diamide, fumaric acid monoethyl ester amide, fumaric acid diamide, itaconic acid monobutyl ester amide and itaconic acid diamide.

The term $\alpha,\beta$-ethylenically unsaturated aromatic compound is understood to include styrene, vinyl toluene, $\alpha$-methylstyrene and the nuclear-substituted styrenes as well as halogenated styrenes.

As $\alpha,\beta$-ethylenically unsaturated alkylcarboxylic acid esters it is possible to use methacrylate, ethylacrylate, butylacrylate, 2-ethylhexylacrylate and/or the corresponding methacrylates and/or the corresponding ethacrylates and/or the corresponding phenylacrylates, vinyl chloride, vinyl acetate, dimethylmaleinate, diethylmaleinate, dibutylmaleinate, dihexylmaleinate, di - (2 - ethylhexyl)- maleinate and/or the corresponding fumarates and/or the corresponding itaconates; trimethylaconitate, toiethylaconitate, tributylaconitate, trihexylaconitate, tri- (2-ethylhexyl)-aconitate and/or the $\alpha,\beta$-ethylenically unsaturated simple or mixed alkylcarboxylic acid esters prepared with alcohols having from 1 to 18 carbon atoms. As monoalcohols it is possible to use methanol, ethanol, propanol, butanol, isobutanol, hexanol, 2-ethylhexanol, methylglycol, ethylglycol and butylglycol.

Suitable compounds that give off formaldehyde are for example aqueous or alcoholic solutions of formaldehyde, paraformaldehyde, trioxane and/or hexamethylenetetramine.

The polymerization initiators that are suitable include the organic peroxides, such as benzoyl peroxide, p-tert.- butyl peroxide, cumene hydroperoxide and $\alpha,\alpha'$-azodiisobutyric acid dimitrile. Furthermore, it is possible to use as Redox polymerization catalysts for example the following reducing agents: lauryl mercaptan, dodecyl mercaptan and thioglycolic acid.

The copolymerization is carried out by polymerizing, upon heating, a mixture consisting of

| | Parts by weight |
|---|---|
| (a) $\alpha,\beta$-ethylenically unsaturated carboxylic acid anhydrides and/or carboxylic acids | 9 to 25 |
| (b) $\alpha,\beta$-ethylenically unsaturated carboxylic acid amides | 5 to 15 |
| (c) $\alpha,\beta$-ethylenically unsaturated aromatic compounds | 5 to 35 |
| (d) $\alpha,\beta$-ethylenically unsaturated alkylcarboxylic acid esters | 5 to 50 | in the presence of inert solvents, or solvents that have no harmful action, such as xylene, toluene, butanol, butylglycol, ethylglycol, methylisobutylketone singly or in the form of mixtures, or under block polymerization conditions in the presence of polymerization accelerators, and thereupon reacting, by heating, the copolymer in the form of a solution mixed with substances that give off formaldehyde and monoepoxides in the presence of basic catalysts.

The preferred mode of operation is to copolymerize by heating a mixture consisting of

| | Parts by weight |
|---|---|
| (a) $\alpha,\beta$-ethylenically unsaturated carboxylic acids and/or carboxylic acid anhydrides | 10 to 15 |
| (b) $\alpha,\beta$-ethylenically unsaturated carboxylic acid amides | 5 to 15 |
| (c) $\alpha,\beta$-ethylenically unsaturated aromatic compounds | 15 to 35 |
| (d) $\alpha,\beta$-ethylenically unsaturated alkylcarboxylic acid esters | 30 to 50 | in a solvent mixture of xylene/butanol in the presence of alkyl mercaptan and peroxides and (e) reacting, by heating, the resulting product mixed with an alcoholic formaldehyde solution and ethylene oxide and/or propylene oxide in the presence of tertiary amines or quaternary ammonium bases.

The preparation of the copolymer is more particularly carried out by first heating the solvent mixture mixed with the alkyl mercaptan to a temperature of 115 to 130° C. and thereupon running in the mixture of $\alpha,\beta$-ethylenically unsaturated compounds and polymerization accelerator, while maintaining the same temperature, and polymerizing the whole until the desired solids content of the $\alpha,\beta$-ethylenically unsaturated compounds in the solution is obtained; if necessary, further additions of polymerization accelerator are made in order to arrive at the desired solids content.

A preferred method of preparing the copolymers consists in carrying out the polymerization by heating at 70 to 130° C. the solvent mixture, the alkyl mercaptan and the $\alpha,\beta$-ethylenically unsaturated compounds upon addition of polymerization accelerators.

The reaction of the copolymers with formaldehyde and monoepoxides, carried out at temperatures between 70–90° C., yields copolymers, wherein the acid numbers of the copolymers before the reaction should be of the order of about 50–120. After the reaction with propylene oxide and formaldehyde the acid number drops to 5–25. The end products prepared therefrom yield, upon baking at 150–180° C., ductile and hard films that are resistant to chemicals, adhere with tenacity to metals and glass and have excellent stability to yellowing. Suitable monoepoxides for the above purpose are for example ethylene oxide and/or propylene oxide.

If the reaction is carried out, under the same conditions, in such a manner that the carboxyl and amido groups-carrying copolymers are first reacted with monoepoxides in the presence of tert. amines to form polyhydroxyl groups-containing copolymers, the subsequent reaction with formaldehyde does not yield the desired heat-hardenable copolymers. Products obtained by these reactions yield, upon baking at 150–180° C., brittle films that are not resistant to chemicals. The films, furthermore, have a tendency to become yellow at the temperatures indicated.

If the reaction is carried out, at the same reaction conditions, in such a manner that the carboxyl and amido groups-containing copolymers are first reacted with formaldehyde and thereafter reacted with propylene oxide in the presence of tert. amines, this procedure has been found to cause jellification of the products even before the reaction has terminated. It was, therefore, surprising to find that, under the same reaction condition, the carboxyl and amido groups-containing copolymers upon being reacted together with monoepoxides and formaldehyde in the presence of tert. amines, are capable of forming very valuable products.

The quantity of formaldehyde used depends on the quantity of amido groups present. For each mole proportion of amido groups there are used 1–1.3 mole proportions of formaldehyde.

The quantity of monoepoxide used depends on the quantity of carboxyl groups to be esterified. For each mole proportion of carboxyl groups there are used about 1.5–2.0 mole proportions of monoepoxide.

By the use, in accordance with the present invention, of monoepoxides with formaldehyde in the presence of tert. amines with specific carboxyl and amido groups-containing copolymers, it is possible to lower the acid numbers. Valuable products can be obtained with acid numbers of 5–25. The lowering of the acid number is due to the fact that oxyalkyl esters are formed in the copolymer by the reaction of the monoepoxide with the carboxyl groups of the copolymer, while the formaldehyde reacts with the amido group to form methylol groups in the copolymer. Presumably, also an etherification of the methylol group with the monoepoxide takes place thus forming a methyloloxyalkyl ether in the copolymer, since more monoepoxide is used up than is necessary for the esterification.

The copolymers, in order to improve the surface hardness, can be combined with butanol-etherified melamine or ureaformaldehyde resins. However, it is important not to exceed or to fall short of the following proportions:

| | Parts by weight |
|---|---|
| Etherified melamine and/or urea-formaldehyde resin | 10–40 |
| and | |
| Copolymer | 60–90 |

Furthermore, the copolymers are capable of being combined with resinous epoxy compounds having an epoxide equivalent of 125–1000. However, it is important not to exceed or to fall short of the following proportions:

| | Parts by weight |
|---|---|
| Resinous epoxy compounds | 10–30 |
| and | |
| Copolymer | 70–90 |

The present invention, moreover, relates to a process for the preparation of water-soluble copolymers which is characterized in that (a) α,β-ethylenically unsaturated carboxylic acids and/or carboxylic acid anhydrides,
(b) α,β-ethylenically unsaturated carboxylic acid amides,
(c) α,β-ethylenically unsaturated aromatic compounds,
(d) α,β-ethylenically unsaturated alkylcarboxylic acid esters, are copolymerized to acid numbers of about 50–150 in solvents that are sufficiently soluble in water and are thereupon reacted.

(e) With monoepoxides and formaldehyde in the presence of tertiary amines and/or ternary ammonium compounds in such a way that the reaction products have acid numbers of about 30–70 and
(f) The reaction products are reacted with ammonia and/or amines in at least such quantities that water-soluble products are formed. It is preferred to carry out the process by using in steps a–d the following mixtures:

| | Parts by weight |
|---|---|
| (a) α,β-ethylenically unsaturated carboxylic acids and/or carboxylic acid anhydrides | 9–25 |
| (b) α,β-ethylenically unsaturated carboxylic acid amides | 5–15 |
| (c) α,β-ethylenically unsaturated aromatic compounds | 5–35 |
| (d) α,β-ethylenically unsaturated alkylcarboxylic acid esters | 5–50 |

In the preparation of these water-soluble copolymers it is preferred to use for the reaction of the copolymer with monoepoxides and formaldehyde, small quantities of tertiary amines. The following tertiary amines are useful: trimethylamine, triethylamine, triethanolamine and ethyldiethanolamine and the like.

In treating the reaction products with ammonia and/or amines it is possible to use as amines the diamines, such as ethylene diamine, secondary amines, such as diethylamine and/or heterocyclic amines, such as morpholine and the like.

As solvents that are sufficiently soluble in water it is possible to use water-soluble mono- and/or polyalcohols, water-soluble ketones, water-soluble esters and water-soluble glycol ethers. Water-soluble mono- and/or polyalcohols are for example methanol, ethanol, propanol, butanol, secondary butanol and the corresponding isomers, ethylene glycol, propylene glycol and polyglycols. As water-soluble ketones it is possible to use for example acetone and butanone. As water-soluble esters are suitable for example glycolic acid methyl-, ethyl- and butyl-esters. Suitable water-soluble glycol ethers are ethylglycol, butylglycol and diethyleneglycol ethyl ether.

The resulting copolymers yield upon baking at 150–180° C. water-insoluble and solvent-insoluble films which, aside from having good adhering properties, also possess excellent resistance to yellowing. To improve the surface hardness it is possible to use partially or completely etherified methylolmelamine- or etherified methylolurea resins that are dissolved in water and are capable of swelling. More particularly, it is possible to use tetramethoxymethylolmelamine, pentamethoxymethylolmelamine, hexamethoxymethylolmelamine or mixtures thereof. It is also possible to etherify higher molecular weight melamine- or urea-formaldehyde resins with methanol, ethanol or other water-soluble alcohols. However, melamine- or urea resins obtained therewith must be capable of swelling in water or capable of being diluted in water.

In German Patent 1,038,754 there are described copolymers obtained by reacting a short-chained α,β-unsaturated monocarboxylic acid with a vinyl monomer and a monoepoxide in the presence of an epoxy-carboxy-catalyst and a catalyst for the vinyl polymerization. The end products are polyhydroxy-copolymers. However, these products are incapable of cross-linking upon baking since the solvent stability with respect to aromatic solvents is completely lacking.

The copolymers prepared in accordance with the present invention, which contain the α,β-ethylenically unsaturated carboxylic acids, α,β-ethylenically unsaturated amides as well as α,β-ethylenically unsaturated alkylcarboxylic acid esters and α,β-ethylenically unsaturated aromatic compounds in the indicated ranges and which are reacted in a mixture with monoepoxides and paraformaldehyde in the presence of tert, amines or quaternary ammonium bases, yield upon baking at 150–180° C. films that are capable of cross-linking and having the excellent properties mentioned above, such as resistance to aromatic solvents and ketones.

*Example 1.—Preparation of copolymers that are soluble in aromatic solvents and are capable of hardening by heating*

In a three-neck flask provided with a stirrer, thermometer and reflux cooler are introduced:

| | Parts by weight |
|---|---|
| Butanol | 375.0 |
| Xylene | 720.0 |
| Lauryl mercaptan | 36.8 |
| Methacrylic acid | 113.0 |
| Acrylamide | 143.0 |
| Styrene | 407.0 |
| Ethylacrylate | 359.0 |
| Butylacrylate | 336.0 | and heated to boiling with recycling of the distillate. The following mixture

| | Parts by weight |
|---|---|
| Xylene | 230.0 |
| Di-tert butyl peroxide | 18.4 | is then run in over a period of 60 minutes whereupon the whole is polymerized for 4–5 hours at a temperature of 123 to 180° C. until the solids content of the solution amounts to 50%. The viscosity according to Gardner-Holdt at 20° C. is $Z_1$ to $Z_2$. At 90° C. there are added to the solution 4.6 cc. triethylamine, and at this point is started the introduction of a mixture consisting of

| | Parts by weight |
|---|---|
| 40% butanolic formaldehyde solution | 196.0 |
| Propylene oxide | 110.0 |

The introduction is terminated after 30 minutes. After this, the reaction is continued for a few more hours at 90° C. until the acid number of 15–20 is obtained. The solids content of the solution amounts to 50% and the viscosity was found to be 250–300 DIN-sec. at 20° C.

The product has excellent stability toward aromatic solvents and ketones after baking at 150 to 180° C. for a period of 30 minutes. The adhering capacity on glass and metallic substrates is outstanding.

*Example 2*

Into a flask provided with a stirrer, a thermometer and a reflux cooler, there is introduced a mixture consisting of

| | Parts by weight |
|---|---|
| Butanol | 174 |
| Butylglycol | 348 | and heaeted therein to 125–130° C. Mixtures I and II are then run in separately, drop by drop, in a ratio of about 3:1 while maintaining the temperature in the flask.

MIXTURE I

| | Parts by weight |
|---|---|
| Methacrylic acid | 136 |
| Acrylamide | 72 |
| Styrene | 136 |
| Ethylacrylate | 136 |
| Butylacrylate | 200 |

MIXTURE II

| | Parts by weight |
|---|---|
| Butylglycol | 105 |
| Lauryl mercaptan | 18 |
| p-Tert. butyl peroxide | 9 |
| Butanol | 53 |

The mixture is thereupon heated for about 2–3 hours at 130° C. until the solids content of the solution is about 50°. The viscosity according to the Gardner-Holdt scale is about $Z-Z_1$. After cooling down to 80–85° C. there are added 55 parts by weight triethylamine, and immediately thereafter a mixture consisting of

| | Parts by weight |
|---|---|
| Propylene oxide | 38 |
| and | |
| Butanolic 40% formaldehyde solution | 100 | within a period of 10 minutes and held at the temperature of 80–85° C. until the acid number is about 65. After the addition of 10 cc. of water (to destroy the excess of propylene oxide), there are added another 20 parts by weight triethylamine until the pH is of the order of 8.5–8.8 and the product is capable of being diluted with water at least to the extent of 1:2. A film baked at 150–180° C. for 30 to 40 minutes was found to have a good resistance to water as well as excellent solvent stability with respect to aromatic solvents.

Moreover, it is possible to combine this resin with melamine- or urea-formaldehyde resins that are water-soluble and capable of swelling in water, the proportions being 95:5 to 65:35. The baked films yield clear and flexible coatings that are stable toward chemicals.

I claim:
1. A process for preparing copolymers by reacting α,β-ethylenically unsaturated carboxylic acids, vinyl monomers and monoepoxides which comprises
   (A) polymerizing (a) at least one member of a group consisting of α,β-ethylenically unsaturated carboxylic acid anhydrides and carboxylic acids, (b) at least one α,β-ethylenically unsaturated carboxylic acid amide, (c) at least one α,β-ethylenically unsaturated aromatic compound selected from a group consisting of styrene, vinyl toluene, alpha methylstyrene, and halogenated styrenes, (d) at least one α,β-ethylenically unsaturated alkylcarboxylic acid ester, in the presence of a polymerization accelerator and solvent by applying heat, and
   (B) thereafter simultaneously reacting the copolymers by heating them at a temperature of from 70 to 90° C. with (1) at least one member of a group consisting of formaldehyde and substances that give off formaldehyde selected from a group consisting of paraformaldehyde, trioxane and hexamethylenetetraamine, and (2) at least one epoxide selected from a group consisting of ethyleneoxide and propyleneoxide in the presence of a tertiary amine selected from a group consisting of trimethylamine, triethylamine, triethanolamine and ethyldiethanolamine, components (a), (b), (c) and (d) being used in substantially the following proportions by weight:
   (a) 9 to 25 parts
   (b) 5 to 15 parts
   (c) 5 to 35 parts
   (d) 5 to 50 parts.

2. A process as set forth in claim 1 wherein components (a), (b), (c) and (d) are in substantially the following proportions by weight:
   (a) 10 to 15 parts
   (b) 5 to 15 parts
   (c) 15 to 35 parts
   (d) 30 to 50 parts.

3. A process as set forth in claim 1 wherein (a) is methacrylic acid, (b) is acrylamide, (c) is styrene, and (d) is an ester selected from a group consisting of ethylacrylate and butylacrylate.

4. A process for the preparation of water-soluble copolymers according to claim 1 wherein the copolymerization is carried out in a water-soluble solvent until acid numbers of about 50 to 150 are obtained whereupon the copolymer is reacted at about 70–90° C. with at least one monoepoxide selected from the group consisting of ethylene and propylene oxides and formaldehyde in the presence of a tertiary amine selected from a group consisting of trimethylamine, triethylamine, triethanolamine and ethyldiethanolamine, to produce a reaction product having an acidic number of about 30 to 70, after which the reaction product is reacted with a member of a group consisting of ammonia and amines and mixtures thereof to produce a water-soluble product.

5. The product resulting from the process of claim 1.

References Cited by the Examiner

UNITED STATES PATENTS

| | | | |
|---|---|---|---|
| 2,607,761 | 8/1952 | Seymour | 260—78.5 |
| 2,870,117 | 1/1959 | Vogel et al. | 260—73 |
| 2,940,944 | 6/1960 | Christenson | 260—72 |

JOSEPH L. SCHOFER, *Primary Examiner.*

J. A. SEIDLECK, *Assistant Examiner.*